United States Patent Office 3,198,831
Patented Aug. 3, 1965

3,198,831
PROCESS FOR THE PRODUCTION OF N,N-DIETHYLTOLUAMIDES
Frederick G. Van Stryk, Guelph, Ontario, Canada, assignor to United States Rubber Company, New York, N.Y., a corporation of New Jersey
No Drawing. Filed Apr. 19, 1962, Ser. No. 188,885
4 Claims. (Cl. 262—558)

This invention relates to a process for the preparation of N,N-diethyltoluamides and more particularly to the preparation of N,N-diethyl-m-toluamide, a known insect repellent.

The preparation of N,N-diethyl-m-toluamide, by reacting m-toluylchloride with diethylamine, has been recorded in the literature. In U.S. Patent No. 2,932,665, a process has been reported in which N,N-diethyl-m-toluamide is produced in high yield and with high conversion, and with minimum formation of color and odor bodies and other by-products, through utilization of a continuous vapor phase process involving a selective catalyst which may be either silica gel or alumina.

It has now been found that N,N-diethyltoluamides may also be produced in high yield and with high conversion with a minimum formation of undesirable by-products by the use of boron phosphate as a catalyst in a continuous, vapor phase process for the reaction of toluic acid with diethylamine. The process involves continuously introducing diethylamine and toluic acid, in a molar ratio of amine to acid which is between about 2:1 and about 6:1, into a reaction zone containing boron phosphate as the catalyst, and passing the amine and acid in intimate contact with each other over said catalyst at a rate which corresponds to a contact time of up to about 2 minutes, the temperature being in the range of 250° to 350° C. The amide is continuously removed in the vapor state from the reaction zone and is condensed.

A method of preparing boron phosphate is described in U.S. Patent No. 2,200,734.

The process of this invention is more particularly set forth in the following specific examples. All parts and percentages are by weight unless otherwise noted. The examples were carried out in a tubular glass reactor, designed for down flow and fitted with an inlet at one end and an outlet at the other, and also carrying the necessary thermocouples and heating circuits. The tube had a diameter of 30 mm. and was 32 inches in length. The outlet was attached to a water-cooled condenser which in turn was attached to a glass receiver. The bottom 2 inches of the reactor contained inert packing material composed of Raschig rings and glass beads. The next 26 inches of the tube was packed with boron phosphate of 4–8 mesh size as the catalyst. The final 4 inches of the tube was packed with glass beads.

A convenient method of introducing the toluic acid and diethylamine to the reactor is in the form of the diethylammonium toluate salt of the two reactants, which may be simply formed by adding the toluic acid to the required amount of stirred diethylamine maintained at a temperature below 40° C. to minimize loss of amine and keep the solution from discoloring. The molar ratio of amine to acid may range from about 2:1 to about 6:1, although a molar ratio of 4:1 is preferred. The diethylammoniumtoluate solution is continuously fed into the tubular glass reactor containing the boron phosphate catalyst. The amine and acid, in intimate contact with each other, are passed over the catalyst at a rate corresponding to a contact time ranging from 0.1 to 2 minutes, the temperature being in the range of 250° to 350° C., although a contact time of from 0.5 to 1 minute and a temperature range of from 275° to 290° C. is preferred.

Generally, the shorter contact times should be used at the more elevated temperatures, whereas the longer contact times should be used at the lower temperatures within the specified range. The reactor effluent is collected in a suitable receiver. The reaction product is stripped of diethylamine at atmospheric pressure to a pot temperature of about 180° C. The residue is then diluted with ether and extracted with portions of 5% sodium hydroxide until a precipitate no longer forms on acidification of the extract. The combined extracts are back-washed with ether which is combined with the organic phase. The caustic layer is then acidified with HCl; heated to remove residual ether; and cooled with stirring until the recovered toluic acid has solidified. The toluic acid is isolated by filtration and dried. The organic layer containing the amide is stripped of ether under reduced pressure and the stripped material is then distilled in a packed column under reduced pressure. In all examples, the amide product was collected at 160–170° C./16 mm.

The following examples illustrate the invention.

*Example I*

A diethylammoniumtoluate feed solution was prepared by the slow addition of 105.4 grams of m-toluic acid to 225.4 grams of diethylamine, corresponding to a molar ratio of 1:4, at a temperature of 30°–35° C. The feed solution was fed dropwise to the heated reactor from a separatory funnel. The temperature of the reaction chamber packed with the boron phosphate catalyst was between 280–290° C. The contact time was approximately 0.5–1.0 minute. The reaction product was stripped of diethylamine at atmospheric pressure and a pot temperature of about 180° C. The residue was then diluted with ether and extracted with portions of 5% sodium hydroxide until a precipitate no longer formed on acidification of the extract. The combined extracts were back-washed with ether which was combined with the organic phase. The caustic layer was then acidified with HCl and heated to remove residual ether. It was cooled with stirring until the recovered toluic acid had solidified. This was isolated by filtration and dried. The organic layer containing the amide was stripped of ether under reduced pressure and the stripped material was then distilled in a packed column under reduced pressure. The amide distilled at 160–165° C./16 mm. The yield was 124.0 grams of N,N-diethyl-m-toluamide, corresponding to an 83.8% yield. 13.0 grams of m-toluic acid was recovered. The conversion ratio was 95%.

*Example II*

A diethylammoniumtoluate feed solution was prepared by the slow addition of 35.1 grams of m-toluic acid to 75.1 grams of diethylamine, corresponding to a molar ratio of 1:4, at a temperature of 30°–35° C. This feed solution was fed dropwise to the heated reactor from a separatory funnel. The temperature of the reaction chamber containing the boron phosphate catalyst was between 275–285° C. The contact time was approximately 0.5–1.5 minutes. The reactor effluent was collected in the receiver, stripped of diethylamine and treated as in the foregoing example. After distilling the product under reduced pressure, there was obtained 41.7 grams of N,N-diethyl-m-toluamide, corresponding to a yield of 84.5%. 4.3 grams of m-toluic acid were rerecovered. The conversion ratio was 96%.

The general procedure of these examples is also applicable to p-toluic acid with comparable results.

Having thus described my invention, what I claim and desire to protect by Letters Patent is:

1. A continuous, vapor-phase process for the preparation of N,N-diethyltoluamide which comprises continuously introducing diethylamine and toluic acid, in a molar ratio of amine to acid between about 2:1 and about 6:1, into a reaction zone containing a boron phosphate catalyst, passing said amine and said acid in intimate contact with each other over said catalyst at a rate corresponding to a contact time of up to about 2 minutes, the temperature being in the range of 250° to 350° C., continuously removing the vaporized amide from said reaction zone and condensing said amide.

2. The process of claim 1 wherein the diethylamine and toluic acid introduced into the reaction zone are in the form of diethylammoniumtoluate.

3. The process of claim 1 wherein the toluic acid is m-toluic acid.

4. The process of claim 1 wherein the minimum reaction temperature is 275° C.

References Cited by the Examiner

UNITED STATES PATENTS

| | | | |
|---|---|---|---|
| 1,882,335 | 10/32 | Mills | 260—518 |
| 2,003,842 | 6/35 | Spiegler | 260—518 |
| 2,711,415 | 6/55 | Cottle et al. | 260—558 |
| 2,932,665 | 4/60 | Wagner | 260—558 |

OTHER REFERENCES

Bennett: Standard Chemical and Technical Dictionary, page 26, The Chemical Publishing Co., Inc., N.Y. (1939).

Richarz et al.: Helv. Chim. Acta, volume 42, page 2212–2218 (1959).

Sabatier: "Catalysis in Organic Chemistry," p. 901, D. Van Nostrand and Co. (1922).

WALTER A. MODANCE, *Primary Examiner.*

IRVING MARCUS, *Examiner.*